INVENTOR:
ARTHUR C. FIRL

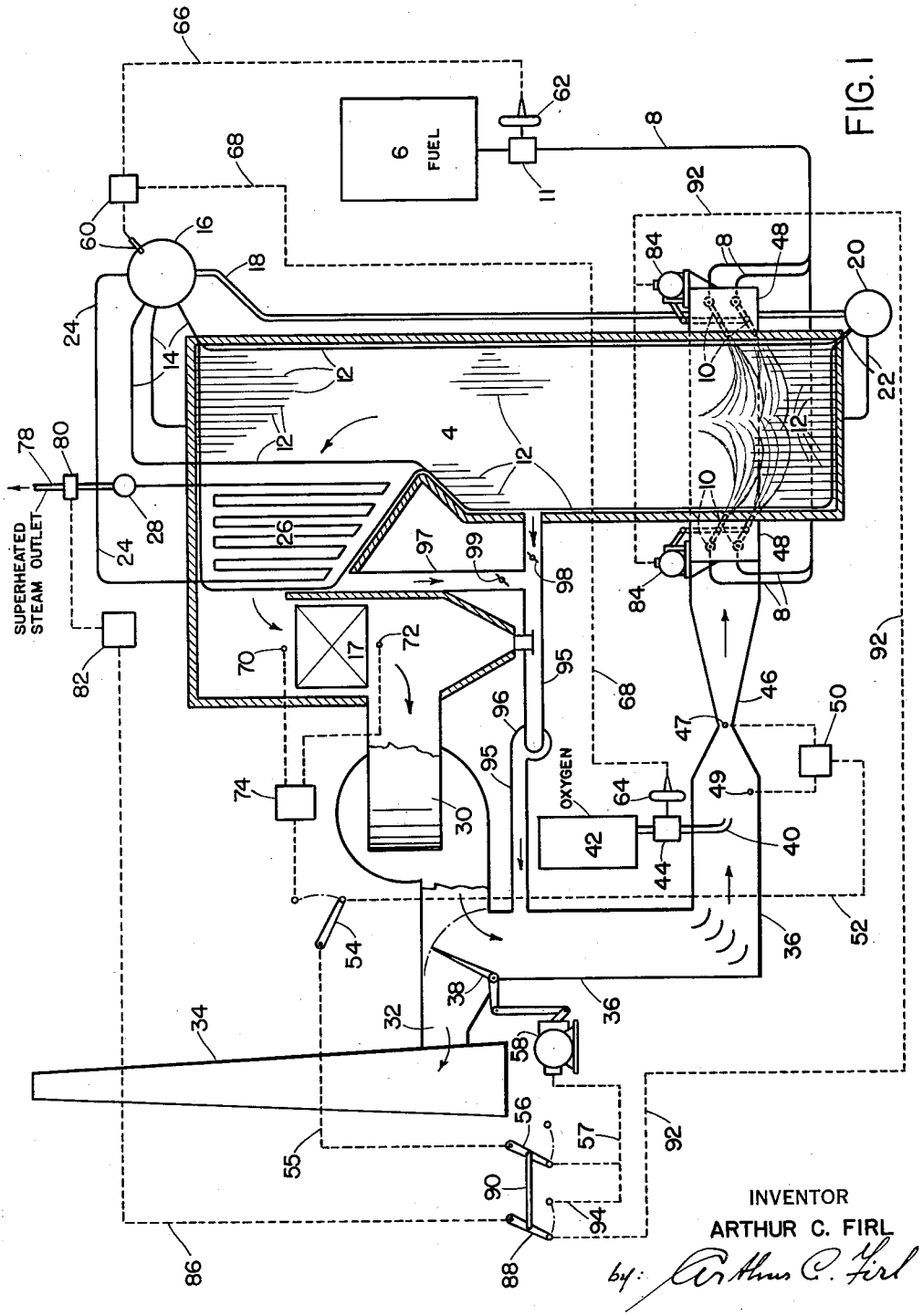
FIG. I
INVENTOR
ARTHUR C. FIRL

United States Patent Office 2,980,082
Patented Apr. 18, 1961

2,980,082

METHOD OF OPERATING A STEAM GENERATOR

Arthur C. Firl, Ridgefield Park, N.J., assignor to Combustion Engineering, Inc., New York, N.Y., a corporation of Delaware Filed Feb. 16, 1955, Ser. No. 488,682

2 Claims. (Cl. 122—459)

This invention relates to improvements in the operation of steam generating furnaces, and is more specifically concerned with ways and means for achieving a more efficient combustion of fuel in the furnace of a steam generating and steam heating apparatus. Another aspect of the invention deals with an improved method of steam temperature control whereby such control can be extended over a wider range of generator loads than heretofore practicable.

In the operation of furnaces in general and of furnaces for steam generation in particular, certain heat losses are encountered which determine the thermal efficiency of the apparatus. These losses include among others carbon loss, moisture in fuel loss, moisture in air loss, radiation loss and dry gas losses. The dry gas losses are of relatively high magnitude and are principally caused by the large amount of nitrogen contained in the air which supports combustion. Atmospheric air is a mechanical mixture of oxygen, nitrogen and slight amounts of carbon dioxide, water vapor, argon and other inert gases. In combustion calculations the carbon dioxide and the inert gases are ordinarily included with the nitrogen; and the generally accepted proportions of oxygen and nitrogen are 20.91% oxygen and 79.09% nitrogen by volume, or 23.15% oxygen and 76.85% nitrogen by weight. The oxygen fulfills its function in the promotion of combustion by separating itself from its mechanical union with nitrogen and by entering into chemical combination with the available combustible. On the other hand, nitrogen acting merely as a dilutent serves no purpose in combustion and is instead as pointed out hereinabove a source of direct loss by absorbing heat while passing through the furnace and carrying off a portion of such heat in leaving the boiler. Attempts have been made to supply oxygen alone to the fuel to reduce the dry gas losses and gain other advantages such as reduction of furnace volume and size of boiler passages and flues. However, the extremely high furnace temperatures produced when oxygen alone, or air greatly enriched with oxygen, is supplied for combustion, rendered such operation impracticable in the majority of cases.

My invention as herein described overcomes the above temperature difficulties while still retaining most of the advantages by an improved method of combustion and operation of an apparatus in which the nitrogen in the air, ordinarily supplied for combustion, is replaced with a smaller or larger amount of recirculated combustion gases. In this manner most, if not all of the nitrogen is excluded, permitting the elimination of up to about 75 percent of the dry gas losses, thereby achieving a substantial increase in the thermal efficiency of the fuel burning apparatus. And at the same time by substituting recirculated gas for the nitrogen in the air furnace temperatures can be retained at the conventional safe level; or the dilution effect of the recirculated gases can be lowered at will to obtain higher furnace temperatures to meet special operating conditions or to take advantage of new advances in the development of heat resisting metals and refractory materials.

Furthermore in the evaporating and heating of steam for power generation, it is of great economic importance to maintain the temperature of the steam entering the turbine at a predetermined constant level over a wide range of steam generator load. Various means have heretofore been employed to accomplish such control of the steam temperature. Foremost among these is the returning or recirculating of combustion gases back to the furnace chamber, after most of the heat contained in these gases has been recovered. The steam temperature is thus controlled in a manner well known in the art by altering the temperature of the gases leaving the furnace at any given load. My method of operating a steam generating and steam heating unit as disclosed herein provides, in conjunction with a steam temperature control system by gas recirculation, a basis for extending by a substantial amount the control range over which the steam temperature can thus be held constant.

It is accordingly a primary object of the invention to reduce the dry gas losses in a vapor generating apparatus.

Another important object of the invention is to improve combustion and control combustion temperature in the furnace of a vapor generating unit by replacing, prior to combustion, the nitrogen in the combustion air with recirculated gaseous products of combustion.

A further object of the invention is to widen the steam temperature control range of a steam generator by applying my inventive improvement to a steam temperature control system operating with gas recirculation.

A still further object of the invention is to simplify and improve the operation of a steam generating unit by maintaining at a practically constant value, over a predetermined load range, the amount of gaseous products of combustion passing through the unit.

Other and further objects of the invention will become apparent to those skilled in the art from the detailed description thereof when taken in conjunction with the accompanying drawings wherein:

Fig. 1 is a diagrammatic representation of a steam generator designed and equipped in accordance with the invention.

Figure 3:
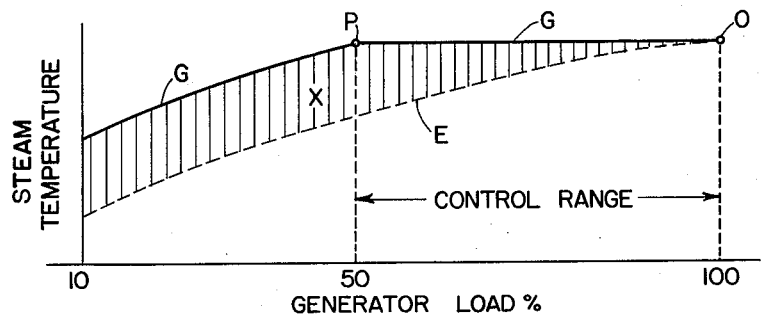
Fig. 3 and Fig. 4 are graphical illustrations showing the superheated steam temperatures plotted against percentages of steam generator load; the former indicating a temperature control range which is representative of a conventional steam boiler operating with air and the latter indicating a range which is representative of a steam boiler operating according to the invention.

In Fig. 1 is shown a steam generating unit equipped with a furnace 4 fired with fuel from a source 6 by way of fuel pipe 8 and burners 10. A fuel valve 11 is provided in pipe line 8 to control the amount of fuel thus burned. The products of combustion pass upwardly through the furnace 4 giving off heat to the furnace walls, roof and floor. These surfaces are lined with water carrying and steam generating tubes 12. The steam and water mixture rising in these tubes flows via tubes 14 into the steam and water drum 16 wherein the water is separated from the steam in a manner well known in the art. Feed water from economizer 17 located in the rear pass of the unit is fed to drum 16 by means not shown. This water and the water separated from the steam enters pipe 18 to flow downwardly into mud drum 20 to be fed via tubes 22 to tubes 12 lining the floor, walls and roof of furnace 4 as aforesaid.

The steam leaves drum 16 by way of tubes 24 and enters superheater 26. In passing through the superheater the steam is heated to a desired temperature by absorbing heat from the combustion gases and leaves via superheater outlet header 28 to be piped to a point of use such as a steam turbine, not shown.

Having given up a large amount of heat to the superheater 26 the gases pass over economizer 17 for final cooling and leave the steam generating unit by way of induced draft fan 30. Some of the cooled combustion gases are discharged into the atmosphere via duct 32 and stack 34. A large portion of the gases however is returned to the furnace by way of recirculating duct 36. Damper 38 serves to proportion the combustion gases between duct 32 and duct 36. According to the invention oxygen of commercial purity and largely free of nitrogen is introduced into the recirculated gas stream such as by pipe 40 from a source 42. Valve 44 controls the amount of oxygen thus introduced. In one embodiment of the invention a venturi meter 46 or similar device is installed in the recirculated gas duct 36 at a point between the furnace 4 and the introduction of oxygen for the purpose of measuring the gas flow entering the furnace. The recirculated gases having thus been enriched with oxygen enter the furnace chamber 4 via burner windbox 48 in surrounding relation with the fuel ejected from burners 10, and in supporting combustion take the place of air customarily made use of for this purpose in conventional furnaces. By substituting recirculated gases for the nitrogen in the air, in accordance with the invention, the dry gas losses can be reduced considerably as earlier herein set forth. Also by virtue of this substitution other advantages in the operation of the steam generating unit can additionally be realized. These will become evident as the description hereof proceeds.

Thus in a steam generator in which the nitrogen in the combustion air has been replaced by recirculated gases and which is subject to variable steaming loads my invention offers important and novel improvements in controlling the combustion of fuel by adjusting the amount of recirculated gases so as to maintain at a substantially constant value over a wide range of load the volume of combustion gases flowing over the heating surfaces of the unit. To serve this purpose a flow measuring device such as venturi 46 may be employed to transmit pressure differential impulses taken at points 47 and 49 to device 50 which in turn converts these impulses into electric impulses in a manner well known in the art. These electric impulses are then transmitted through conduits 52, 53 via switches 54 and 56 to a motor 58 operatively connected to damper 38 for proportioning the flow of gases between duct 32 and recirculated gas duct 36 in response to the variations in gas flow measured by venturi meter 46.

The amount of fuel and oxygen fed to the furnace for combustion and the generation of steam is regulated in the customary manner by response to fluctuations in the steam pressure. Thus in the illustrative embodiment of Fig. 1 a pressure sensitive device 60 transmits by way of conduits 66 and 68 respectively, electric impulses to actuator 62 controlling fuel valve 11 and actuator 64 controlling oxygen valve 44, thereby regulating the flow of fuel and oxygen to the furnace. Thus for a given steam demand a corresponding amount of fuel is fed to the furnace together with a corresponding amount of oxygen to support combustion. As the load demand rises and falls the amount of fuel and oxygen rises and falls to satisfy the demand of heat. However, according to one application of my invention the total volume of oxygen plus recirculated gas is held constant over a wide range of load by offsetting an increase or decrease of oxygen with a decrease or increase respectively of recirculated gases. This is accomplished as earlier described herein by manipulation of damper 38 in response to the variation in gas flow indicated by venturi 46.

Under certain conditions it may be desirable to also take into account variations in fuel quantity with load changes. This can be achieved by adjusting damper 38 in response to variations in total volume of gases flowing over the boiler heating surfaces. Thus damper 38 could then be regulated by measuring the variations in the gas flow passing over economizer 17. As shown in Fig. 1 this can be accomplished by recording a static pressure difference, for instance, between points 70 and 72, translating variations of said pressure difference into electric impulses by means of device 74 and transmitting said impulses via conduit 76 to switch 54. By turning this switch to the upper contact position a circuit is closed through conduit 55, switch 56, conduit 57 to motor 58 operatively engaging damper 38. Suitable points other than 70 and 72 or 47 and 49 for measuring the static pressure for the purpose of controlling damper 38 could be chosen to establish variations in gas flow for different steam generator loads.

Figure 2:
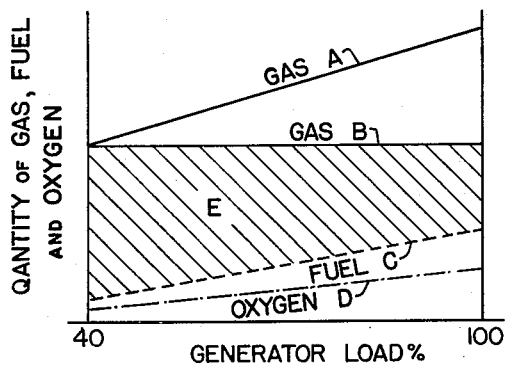
Fig. 2 is a graphical illustration of the relative proportions of oxygen, fuel and recirculated gases when plotted against percentages of steam generator load.

To illustrate more clearly the relationship which exists between combustion gas quantity and percentage of steam generator load reference is made to Fig. 2. In this illustration curve A indicates the increase in combustion gas quantity which would occur in a conventional boiler when the load is raised from 40% to 100% of maximum, for example. Such increase will of course greatly accelerate the gas velocity through the various gas passages and over the heating surfaces, resulting in an increase of draft loss as the load rises.

Curve B on the other hand indicates a constant gas quantity being maintained throughout the desired load range (40% to 100%). This constant gas flow can be established by operating and designing the boiler in accordance with the invention hereinabove set forth. Thus although the fuel quantity and oxygen quantity increases with the load as indicated by curves C and D respectively, the quantity of the gases flowing through the boiler is held at a constant value by decreasing the amount of gases recirculated as indicated by the shaded area E.

A number of important advantages result from operating a steam generator in accordance with the inventive principles set forth hereinabove. These include: an increase in safety of operation at low loads because of elimination of pockets of combustible mixture from the furnace chamber; and a reduction of lag in response to load change, because a change in load involves merely a change of fuel and oxygen and not also a change in dilutent (nitrogen when air is used). Therefore the lag experienced in a conventional unit in which combustion is supported by air can be greatly reduced in a unit in which the gas quantity is held constant at all loads in accordance with the invention. This feature acquires particular importance in connection with steam power plants of naval vessels when a quick response to load changes is imperative in battle maneuvers.

Another improvement made possible by my invention in the operation of steam generators concerns the control of the superheated or reheated steam temperature. This feature of the invention will be described in connection with two control systems most generally employed namely steam temperature control by gas recirculation and steam temperature control by tilting burners. Both of these are well known in the art and for a more detailed description thereof attention is called to U.S. Patent No. 2,229,643 issued to De Baufre describing a method of controlling superheated steam by recirculating combustion gases and U.S. Patent No. 2,363,875 issued to H. Kreisinger and V. Z. Caracristi describing a method for controlling superheated steam temperature by burner tilting.

In Fig. 1 both of these methods are illustrated. Each method can be employed separately or one method may supplement the other in a single steam generator.

The temperature of the superheated steam is measured by a thermostat 80 at a point near the superheater outlet such as for example at the superheater outlet header 28 or at a point on steam pipe 78 leading to the turbine.

Impulses of steam temperature variations are then transmitted to a converter 82 which in turn sends out corresponding electric impulses to motors 84 via conduit 86, switch 88 and conduit 92. Motors 84 are operatively connected to burners 10 by means well known in the art for the purpose of tilting the burners and directing the flames up or down, thereby shifting the region of highest heat intensity to a location in the furnace which is closer to or more remote from the furnace outlet. Such shifting will cause variations in the temperature of the gases leaving the furnace and as a consequence thereof, variations in the steam temperature.

Switch 88 is operatively connected with switch 56 such as by connecting link 90. Therefore if it is desired to control the steam temperature by tilting burners, toggle switch 88 is thrown to the left hand position (as shown) thereby closing the tilting burner circuit 82, 86, 88, 92, 84. At the same time on and off switch 56 is placed in the left hand position thereby permitting control of the recirculated gases for maintaining constant the combustion gas quantity, by the closing of circuit 74, 54, 55, 56, 57, 58 or the closing of circuit 50, 52, 54, 55, 56, 57, 58.

If as an alternative it is desired to control the steam temperature by gas recirculation, switch 88 and switch 56 are thrown to the right hand position, thereby opening the circuit which controls the tilting burners and the circuit which controls damper 38 in response to gas flow impulses and closing circuit 82, 86, 88, 94, 57, 58 for the purpose of controlling the amount of recirculated gas in response to steam temperature variations. A change in the quantity of gas returned to the furnace therefore raises or lowers the temperature of the gases at the furnace outlet, thereby adjusting the temperature of the steam in a manner well known in the art.

Figure 4:
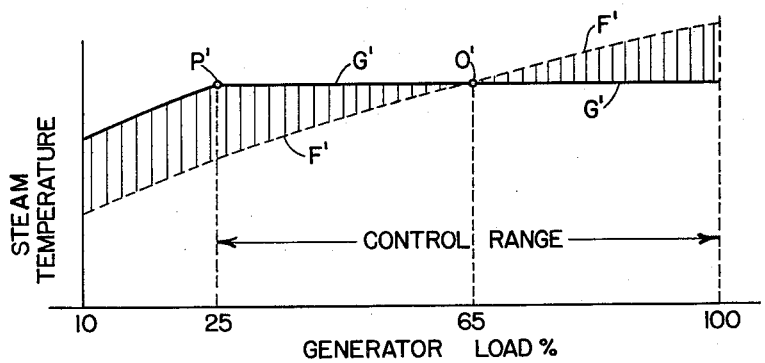

Figs. 3 and 4 illustrate in graphical form the wider control range of superheated steam temperature made possible by the application of my invention.

Thus in Fig. 3 curve F (in broken lines) shows the rise of the steam temperature in a conventional boiler from an intermediate load of 10% to a top load of 100%. In a conventional boiler operating with a mixture of fuel and air the steam temperature can be held constant within a load range of, for example, 50% and 100% at a temperature value indicated by curve G. This can be accomplished by recirculating gases into the furnace within the above range. In this manner the temperature of the steam is increased from values indicated by curve F to values indicated by curve G by amounts represented by the cross-hatched area X. Thus the steam temperature is held constant over a control range of 50% (from 50% load to 100% load).

In a steam generator designed and operating in accordance with my invention, however, the 50% control range can be increased considerably. This will become evident as the description hereof proceeds.

By replacing in effect the nitrogen content in the combustion air with recirculated gases, the percentage of these gases, which act as a dilutent, can be reduced to a value below the percentage of nitrogen in air. In Fig. 3 point O represents the load at which gas recirculation begins with decreasing load. At this point in a conventional boiler the percentage of the dilutent (nitrogen) in the combustion air would be approximately 77% by weight. As the load decreases more dilutent is added such as by recirculating gases until a practical lower limit is reached at point P or 50% load.

In a steam generator operating in accordance with my invention and as illustrated in Fig. 4 the point O of Fig. 3 can be placed at a lower load such as point O' at 65% load. In Fig. 4 broken line curve F' represents the steam temperature obtained without control and curve G' the controlled steam temperature. As the load decreases from point O' gas is recirculated in the same relative amounts as in the unit represented by Fig. 3 until point P' is reached, the lowest practical limit of gas recirculation. In a unit operating in accordance with my invention this point P' may coincide with the 25% load point which is considerably lower than that indicated by point P of Fig. 3. To maintain the steam temperature constant within the load range above point O' in a steam boiler designed in accordance with the invention the amount of recirculated gases is lowered still further thereby increasing the heat absorption in the furnace and lowering the steam temperature as shown by curve F' to the desired value indicated by curve G'.

It is thus seen that in a steam generator that is equipped and operating in accordance with my inventive improvement, the steam temperature control range by gas recirculation can be increased substantially as illustrated in Fig. 4.

Under certain operating conditions it may be desirable to raise the temperature of the recirculated gases such as for instance for the purpose of improving ignition at low loads when large quantities of cooled gases are recirculated.

To serve that end a duct 95 and auxiliary fan 96 are provided (see Fig. 1) to draw hot furnace gases from the the upper part of the furnace chamber 4 and deliver these gases into the stream of cooled recirculating gases passing through duct 36. If desired, gases cooler than those obtained from the upper part of the furnace can be drawn through duct 97 from a location on the downstream side of the superheater 26. Damper 98 in duct 95 and damper 99 in duct 97 are provided to afford control of the gas flow therethrough.

Although a control system has herein been described the impulses of which are transmitted primarily by electrical means, such means are illustrative rather than restrictive. Other means such as for example pneumatic or hydraulic means could be used to practice the invention with equally beneficial results.

What I claim is:

1. A method of operating a steam generator throughout a steam generating load range extending from zero load to maximum load, said generator being fired by fuel suspended in oxygen-enriched combustion gases comprising the steps of forming a mixture solely of recirculated combustion gases, oxygen substantially free of nitrogen and fuel and burning said mixture in a combustion zone thereby producing hot combustion gases for the generation and heating of steam at a lower than maximum steaming load; and maintaining the quantity of said combustion gases constant over a major portion of said steam generating load range by respectively decreasing or increasing the amount of recirculated gases admixed with said fuel and oxygen, while simultaneously increasing or decreasing the input of said fuel and said oxygen in relation to the load demand.

2. A method of operating a steam generator throughout a steam generating load range extending from zero load to maximum load, said generator being fired by fuel suspended in oxygen-enriched combustion gases comprising the steps of forming a mixture solely of recirculated combustion gases, oxygen that is substantially free of nitrogen and fuel and burning said mixture in a combustion zone thereby producing hot combustion gases for the generation and heating of steam at a given steaming load; and increasing or decreasing in response to variation in steaming load the amount of said fuel and said oxygen, but respectively decreasing or increasing the amount of recirculated gases admixed therewith to maintain constant over a major portion of said steam generating load range the amount of combustion gases produced by the burning of said fuel.

References Cited in the file of this patent
UNITED STATES PATENTS

| | | |
|---|---|---|
| 2,229,643 | De Baufre | Jan. 28, 1941 |
| 2,685,279 | Caracristi | Aug. 3, 1954 |
| 2,697,482 | Blizard | Dec. 21, 1954 |